United States Patent
Lin et al.

(10) Patent No.: US 10,460,444 B2
(45) Date of Patent: Oct. 29, 2019

(54) MEMORY DEVICE AND OPERATION METHOD THEREOF

(71) Applicant: MACRONIX INTERNATIONAL CO., LTD., Hsinchu (TW)

(72) Inventors: Yu-Yu Lin, New Taipei (TW); Feng-Min Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 77 days.

(21) Appl. No.: 15/922,987

(22) Filed: Mar. 16, 2018

(65) Prior Publication Data

US 2019/0287251 A1    Sep. 19, 2019

(51) Int. Cl.
| | |
|---|---|
| G06T 7/11 | (2017.01) |
| G06T 1/60 | (2006.01) |
| G06K 9/62 | (2006.01) |
| G06K 9/46 | (2006.01) |

(52) U.S. Cl.
CPC .............. *G06T 7/11* (2017.01); *G06K 9/46* (2013.01); *G06K 9/6267* (2013.01); *G06T 1/60* (2013.01); *G06K 2209/21* (2013.01); *G06T 2207/10032* (2013.01); *G06T 2207/20012* (2013.01); *G06T 2207/20021* (2013.01); *G06T 2207/30201* (2013.01); *G06T 2207/30252* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,894,253 B2* | 2/2011 | Kreupl | ............... | H01L 27/2436 257/3 |
| 2010/0265757 A1* | 10/2010 | Otsuka | ............... | G11C 13/0009 365/148 |
| 2011/0007553 A1* | 1/2011 | Takagi | ............... | G11C 13/0007 365/148 |
| 2011/0310655 A1* | 12/2011 | Kreupl | .................. | G11C 11/16 365/148 |

OTHER PUBLICATIONS

Tim Dettmers: "Deep Learning in a Nutshell: Core Concepts"; Legal Information; Copyright 2018 NVIDIA Corporation; https://devblogs.nvidia.com/parallelforall/deep-learning-nutshell-core-concepts/; pp. 1-9.

* cited by examiner

*Primary Examiner* — Tsung Yin Tsai
(74) *Attorney, Agent, or Firm* — McClure, Qualey & Rodack, LLP

(57) ABSTRACT

Disclosed is a memory device including plural bit lines, plural word lines and a control circuit. The bit lines are configured to receive pixel data of an image. Each word line includes plural factor units. The factor units of each word line are configured differently according to plural factors of a filter. When processing a first area of the image by the filter, the control circuit inputs the pixel data within the first area of the image to the bit lines, and enables one of the word lines for operation. When processing a second area of the image by the filter, the control circuit maintains the pixel data within the second area overlapping the first area on the bit lines, and inputs the pixel data within the second area which doesn't overlap the first area to the bit lines, and enables another one of the word lines for operation.

10 Claims, 4 Drawing Sheets

MEMORY DEVICE AND OPERATION METHOD THEREOF

BACKGROUND OF THE INVENTION

Field of the Invention

The present invention relates to a memory device and operation method thereof.

Description of the Related Art

Object recognition is widely applied in various arts, such as self-driving, satellite imagery analyzing and face recognition. Generally, in a process of object recognition, a great power may be consumed. In the future, energy becomes more and more precious. How to reduce power consumption is one of the subjects of the industry's efforts.

SUMMARY OF THE INVENTION

The present invention provides a memory device and operation method thereof which may reduce power consumption of image processing.

An embodiment of the present invention discloses a memory device including a number of bit lines, a number of word lines and a control circuit. The bit lines are configured to receive a number of pixel data of an image. Each of the word lines includes a number of factor units, and each of the word lines is coupled to the bit lines via the factor units. The factor units of each of the word lines are configured according to a number of factors of a filter. The configurations of the factor units of the word lines are different from each other. The control circuit is coupled to the word lines and the bit lines. When processing a first area of the image by the filter, the control circuit inputs the pixel data within the first area of the image to the bit lines, and enables one of the word lines for operation. When processing a second area of the image by the filter, the control circuit maintains the pixel data within the second area which overlaps the first area on the bit lines, and inputs the pixel data within the second area which does not overlap the first area to the bit lines, and enables another one of the word lines for operation.

An embodiment of the present invention discloses n operation method of memory device, including: providing an image, wherein the image comprises a plurality of pixel data; when processing a first area of the image by the filter, inputting, by a control circuit of the memory device, the pixel data within the first area of the image to a plurality of bit lines of the memory device; enabling, by the control circuit, one of a plurality of word lines of the memory device for operation, wherein each of the word lines comprises a plurality of factor units, the factor units of each of the word lines are configured according to a plurality of factors of a filter, and the configurations of the factor units of the word lines are different from each other; when processing a second area of the image, maintaining, by the filter, the control circuit, the pixel data within the second area overlapping the first area on the bit lines, and inputting the pixel data within the second area which doesn't overlap the first area to the bit lines; and enabling, by the filter, the control circuit, another one of the word lines for operation.

According to the memory device and operation method thereof provided by the present invention, power consumption of image processing may be reduced, and the operation time may even be reduced.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
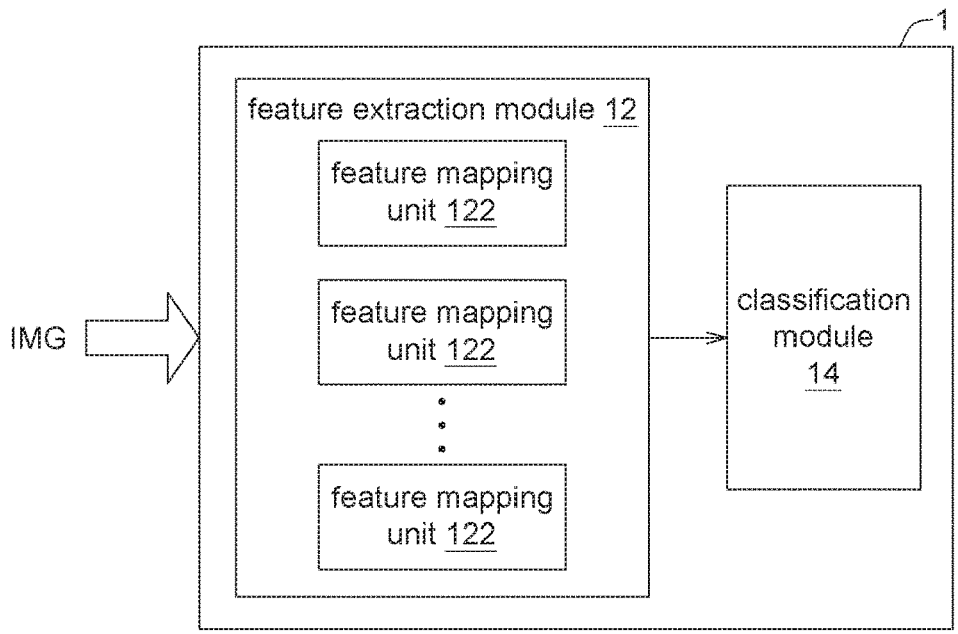
FIG. 1 shows a diagram of system architecture of an image processing system according to an embodiment of the present invention.

Referring to FIG. 1, FIG. 1 shows a diagram of system architecture of an image processing system according to an embodiment of the present invention. The image processing system 1 includes a feature extraction module 12 and a classification module 14. The image processing system 1 may applied to arts of object recognition or neural network. The image processing system 1 is configured to process an image IMG.

Figure 2A:
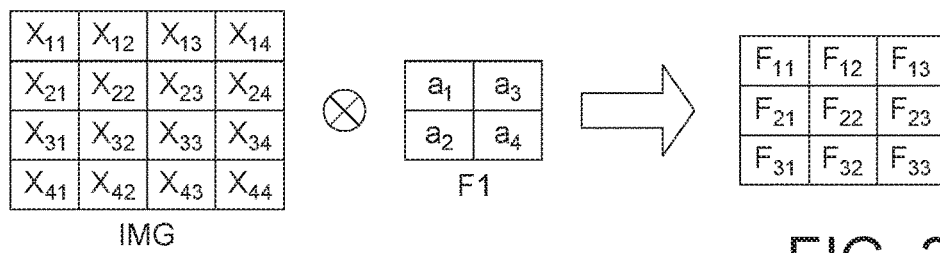
FIGS. 2A and 2B shows a diagram of processing an image by a filter according to an embodiment of the present invention.
Figure 2B:
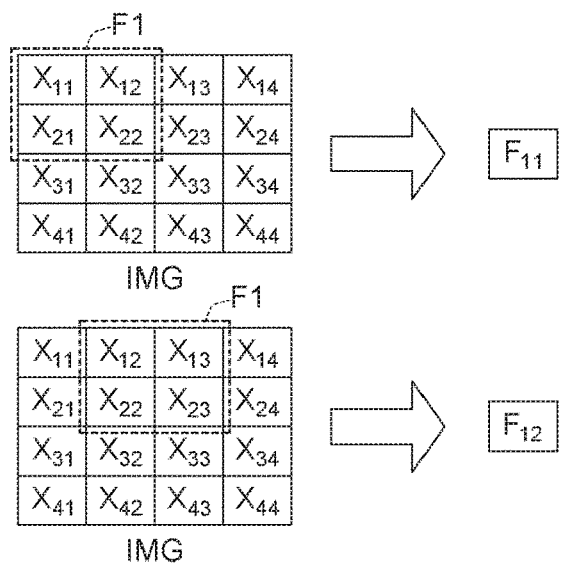

The feature extraction module 12 may include a number of feature mapping units 122. Each of the feature mapping units 122 may process the image IMG by using a filter, wherein the filter may, for example, be a geometric pattern such as a square, a circle or a triangle. In an embodiment, as shown in FIGS. 2A and 2B, the feature mapping unit 122 processes the image IMG by using a filter F1 of size 2×2. The filter F1 includes a number of factors a1, a2, a3, a4. The image IMG is an image of size 4×4 which includes a number of pixel data X11~X44. When processing the image IMG by the filter F1, convolution of the image IMG and the filter F1 is performed. As shown in FIG. 2B, a relative position is between the filter F1 and the image IMG, wherein the relative position is changeable. The "relative position" refers to an area of the image IMG which is going to be processed by the filter F1. For example, when processing a first area of the image IMG by the filter F1, it may be regarded that the filter F1 is covered on the pixel data X11, X21, X12, X22 within the first area of the image IMG, and the pixel data X11, X21, X12, X22 are multiplied by the factors respectively. The output F11 of the feature mapping unit 122 equals to X11\*a1+X21\*a2+X12\*a3+X22\*a4. Similarly, when the filter is covered on the pixel data X12, X22, X13, X23 within the second area of the image IMG, the output F12 of the feature mapping unit 122 equals to X12\*a1+X22\*a2+X13\*a3+X23\*a4, and so forth. When the process of feature mapping is done, the results of feature mapping F11~F33 (as shown in FIG. 2A) may be obtained. These results may be classified by the classification module 14.

Figure 3:
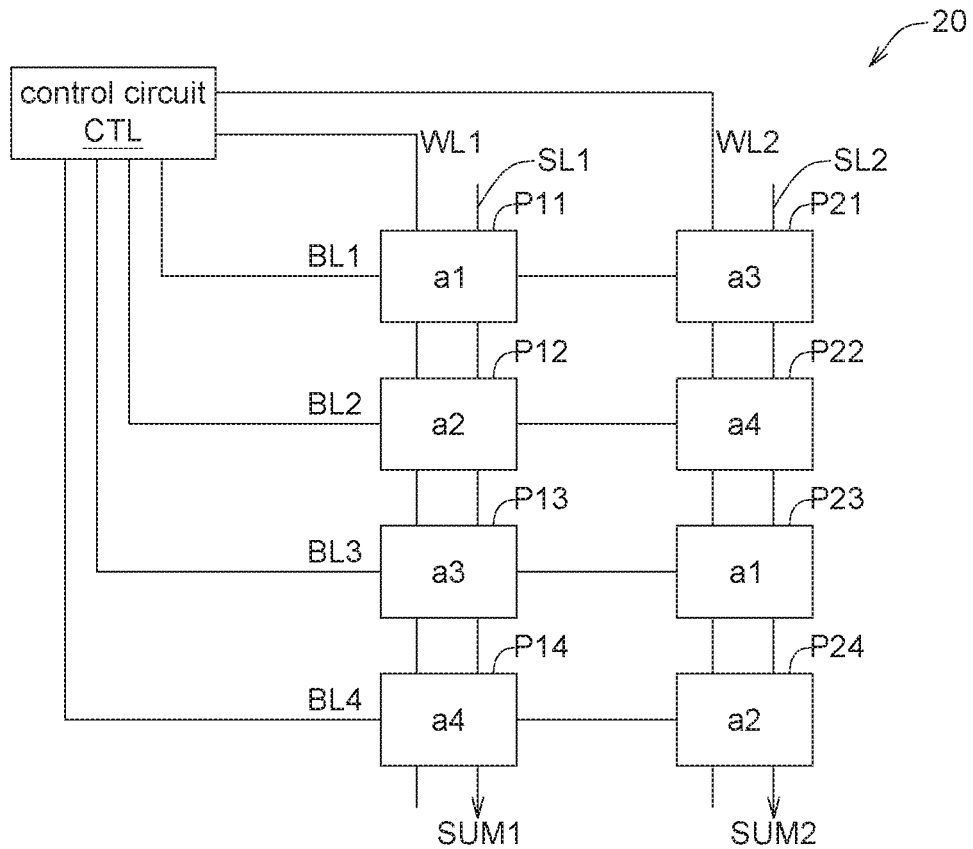
FIG. 3 shows a block diagram of a memory device according to an embodiment of the present invention.

Said feature mapping units 122 may implemented by one or more memory devices, wherein the memory device may be volatile memory or nonvolatile memory, such as NAND type or NOR type memory. Referring to FIG. 3, FIG. 3 shows a block diagram of a memory device according to an embodiment of the present invention. The memory device 20 includes a number of bit lines BL1~BL4, a number of source lines SL1, SL2, a number of word lines WL1, WL2 and a control circuit CTL, wherein the control circuit CTL is coupled to the bit lines BL1~BL4 and the word lines WL1, WL2. The bit lines BL1~BL4 may be provided as input nodes for the pixel data of the image IMG. The word line WL1 includes a number of factor units P11~P14, and the word line WL1 is coupled to the bit lines BL1~BL4 and the source line SL1 via the factor units P11~P14. The word line WL2 includes a number of factor units P11~P14, and the word line WL2 is coupled to the bit lines BL1~BL4 and the source line SL2 via the factor units P21~P24.

The factor units P11~P14 of the word line WL1 are configured according to the factors a1~a4 of the image IMG. Similarly, the factor units P21~P24 of the word line WL2 are also configured according to the factors a1~a4 of the filter F1. However, the configuration of the factor units P11~P14 of the word line WL1 and the configuration of the factor units P21~P24 of the word line WL2 correspond to different arrangements of the factors a1~a4. In this embodiment, the factor unit P11 corresponds to factor a1, the factor unit P12 corresponds to factor a2, the factor unit P13 corresponds to factor a3, the factor unit P14 corresponds to factor a4, the factor unit P21 corresponds to factor a3, the factor unit P22 corresponds to factor a4, the factor unit P23 corresponds to factor a1, and the factor unit P24 corresponds to factor a2.

Figure 4:
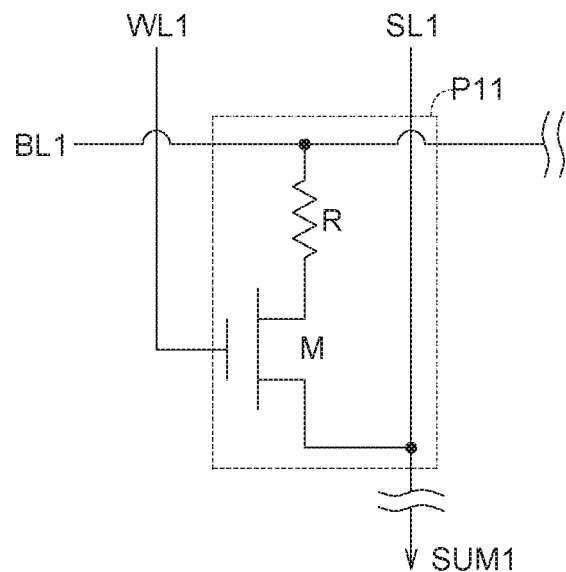
FIG. 4 shows block diagram of a factor unit according to an embodiment of the present invention.

As shown in FIG. 4, in an embodiment, each of the factor units P11~P14, P21~P24 may include a transistor M and one (or more) resistor R. When one of the word lines is enabled by the control circuit CTL, the transistors M of the factor units of the word line may be turned on, and the word line (assuming that the word line WL1 is enabled) may perform operation by using the signals on the bit lines BL1~BL4, and then outputs the result SUM1 via the source line SL1. The resistance of the resistor R may be configured according to the factor corresponding to the factor unit. For example, the resistance of the resistor R of the factor unit P11 is configured according to the factor a1, the resistance of the resistor R of the factor unit P12 is configured according to the factor a2, and so forth.

In an embodiment, the configurations of the factor units P11~P14, P21~P24 are fixed, and may be pre-set in the memory device 20. In another embodiment, the configuration of the factor units P11~P14, P21~P24 are changeable, and the factor units P11~P14, P21~P24 may be programmed by using a factor configuration table which stored in the memory device 20 or an external device (not shown). The external device may be a volatile or nonvolatile memory. The factor configuration table may record the relationship between the factor units P11~P14, P21~P24 of the word lines WL1, WL2 and the factors a1~a4 of the filter F1. That is, the factor configuration table records the arrangement of the factors corresponding to each of the word lines.

Figure 5:
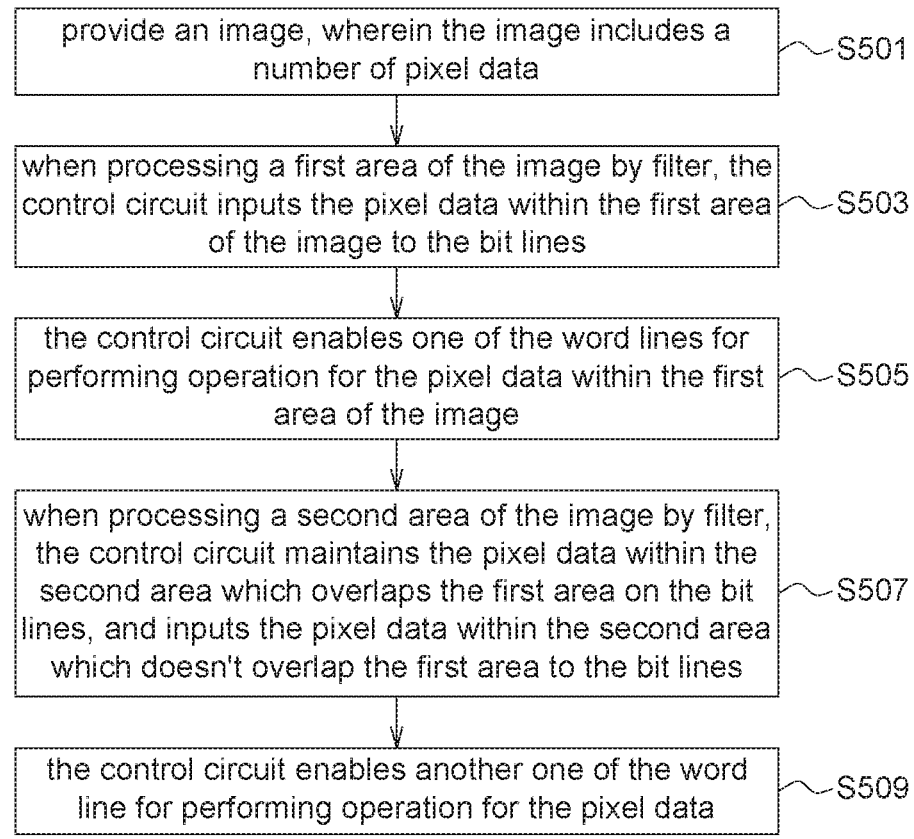
FIG. 5 shows flow cart of an operation method of memory device according to an embodiment of the present invention.

Referring to FIG. 5, FIG. 5 shows a flow chart of an operation method of a memory device according to an embodiment of the present invention. The operation method may be used to operate the memory device 20. The operation method includes steps S501~S509.

In step S501, provide an image IMG, wherein the image IMG includes a number of pixel data X11~X44.

In step S503, when processing a first area of the image IMG by filter F1, the control circuit CTL inputs the pixel data X11, X21, X12, X22 within the first area of the image IMG to the bit lines BL1~BL4. For example, the control circuit CTL inputs the pixel data X11 to the bit line BL1, inputs the pixel data X21 to the bit line BL2, inputs the pixel data X12 to the bit line BL3, and inputs the pixel data X22 to the bit line BL4.

In step S505, the control circuit CTL enables one of the word lines WL1 for performing operation for the pixel data X11, X21, X12, X22 within the first area of the image IMG. In an embodiment, the pixel data X11, X21, X12, X22 are input to the bit lines BL1~BL4 in a form of voltage signal. When the pixel data X11 passes through the resistor R, which is configured according to the factor a1, of the factor unit P11, the generated current may flow into the source line SL1, wherein the generated current may be regarded as a result of X11*a1. Similarly, when the pixel data X21 passes through the resistor R, which is configured according to the factor a2, of the factor unit P12, the generated current may be regarded as a result of X21*a2, and so forth. The currents generated by the pixel data X11, X21, X12, X22 passing through the factor unit P11~P14 may merge in the source line SL1. And then by sensing the total current on the source line SL1 by a sensing amplifier (not shown), the result SUM1, which represents F11, of the operation described above may be obtained. In other words, the output SUM1 of the source line SL1 represents X11*a1+X21*a2+X12*a3+X22*a4, that is, F11.

In step S507, when processing a second area of the image IMG by filter F1, the control circuit CTL maintains the pixel data X12, X22 within the second area which overlaps the first area on the bit lines BL3, BL4, and inputs the pixel data X13, X23 within the second area which doesn't overlap the first area to the bit lines BL1, BL2. In other words, when updating the inputs of the bit lines BL1~BL4, the control circuit CTL may maintain the inputs (the pixel data X12, X22) on the bit lines BL3, BL4, and only update the inputs of the bit lines BL1, BL2. That is, the control circuit CTL inputs the pixel data X13 to the bit line BL1, and inputs the pixel data X23 to the bit line BL2.

In step S509, the control circuit CTL enables another one of the word lines WL2 for performing operation for the pixel data X12, X22, X13, X23 within the second area of the image IMG. Since the factor units P21, P22, P23, P24 are configured respectively according to the factors a3, a4, a1, a2, the currents may merge in the source line SL2 as a result F12 of X13*a3+X23*a4+X12*a1+X22*a2.

In an embodiment, the control circuit CTL may determine the word line for performing operation according to the relative position between the filter F1 and the image IMG. That is, the control circuit may select word line having the factor units with a corresponding configuration according to the maintained inputs and the updated inputs of the bit lines to obtain a correct calculation result. In another embodiment, the control circuit CTL may determine the word line for performing operation according to the factor configuration table.

In an embodiment, when the filter F1 is shifted to a second boundary of the image IMG from a first boundary of the image IMG by one or more shifts, the filter F1 may be moved to the first boundary of the image IMG and downshift a pixel. In this case, the control circuit CTL may update all inputs of the bit lines BL1~BL4, for example, when finish processing the pixel data X13, X23, X14, X24 of the image IMG by filter F1, the filter F1 may be moved to the pixel data X21, X31, X22, X32 of the image IMG, and the control circuit CTL may update the inputs of the bit lines BL1~BL4 respectively to X21, X31, X22, X32, and enables the word line WL1 for performing operation.

According to the memory device and operation method described above, when the filter is moved from the first area to the second area of the image, the control circuit only updates the pixel data within the second area which does not overlap the first area of the image to the bit lines, and maintains the pixel data within the second area which overlaps the first area of the image on the bit lines, and then enables corresponding word line(s) for performing operation. Therefore, the times of data moving during the operation process may be reduced, and the power consumption may be reduced thereby.

Figure 6A:
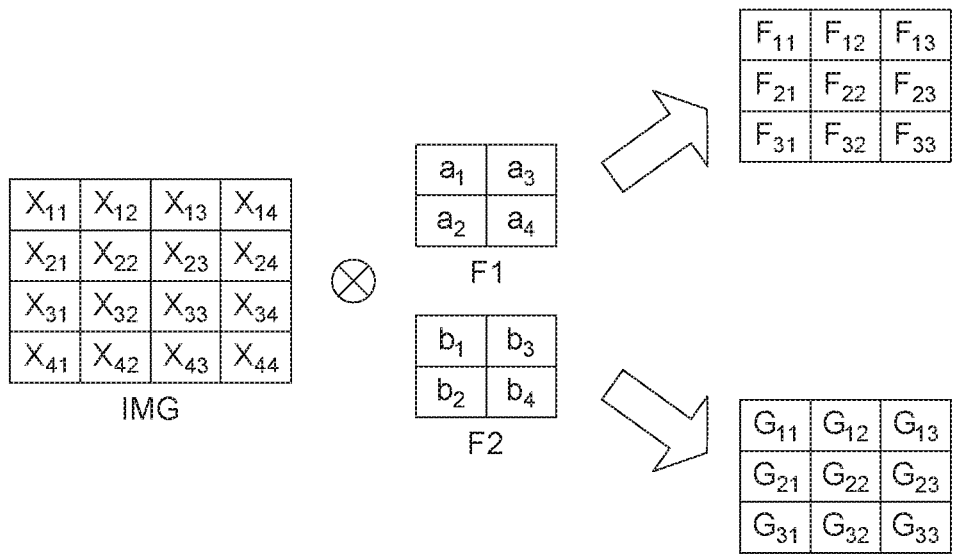
FIG. 6A shows a diagram of processing an image by a filter according to another embodiment of the present invention.
Figure 6B:
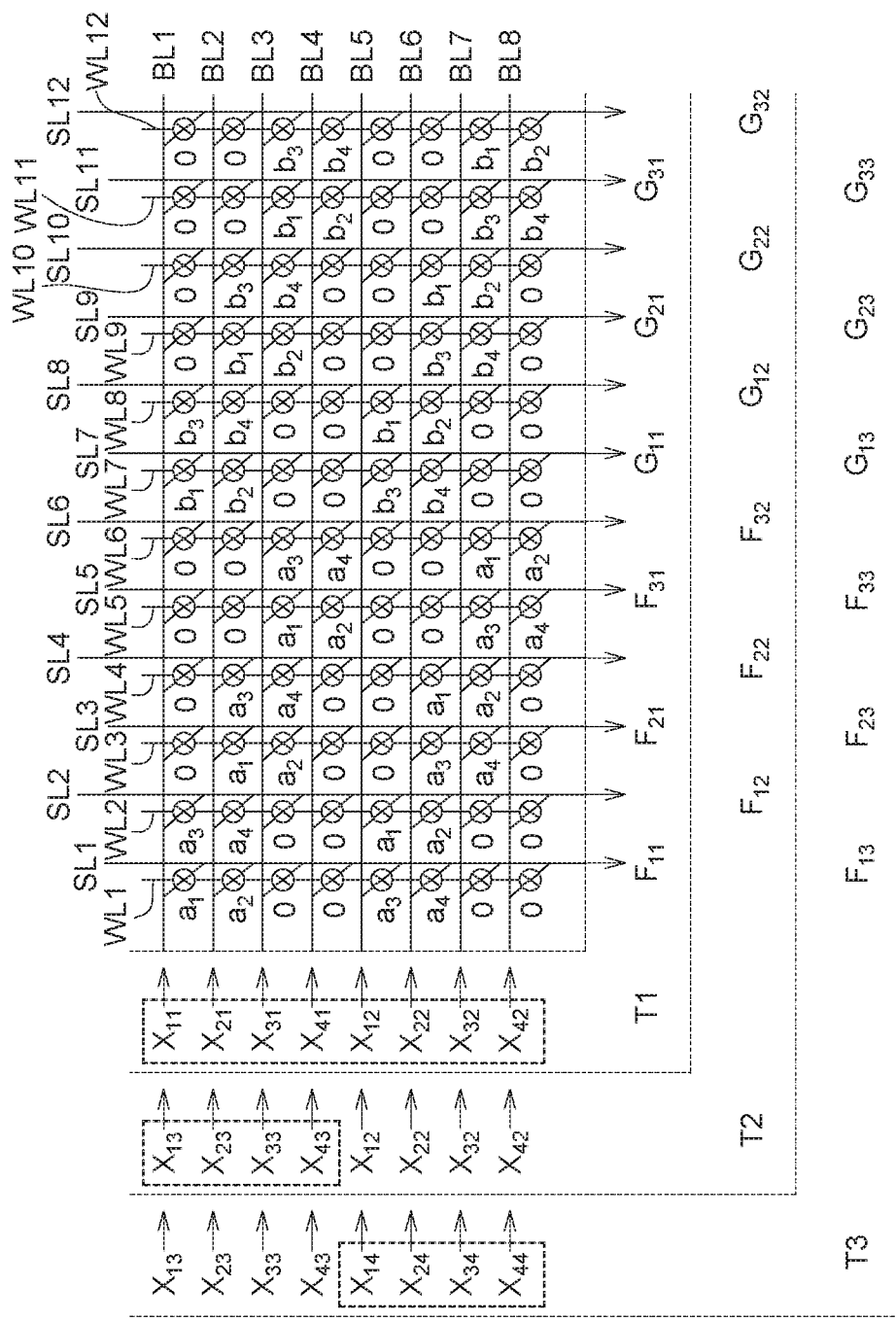
FIG. 6B shows a diagram of operation of a memory device according to another embodiment of the present invention.

Referring to another embodiment shown in FIGS. 6A and 6B, the memory device in this embodiment may be configured to implement the filter F1 and filter F2. The image IMG and the filters F1, F2 are shown in FIG. 6A, and the configuration of the factor units of each of the word lines are shown in FIG. 6B. For clarity of description, the control circuit is omitted in FIG. 6B, and the factor units are expressed by the corresponding factors of the filters F1, F2 or 0.

In this embodiment, the control circuit of the memory device may obtain convolution of the image IMG and filters F1, F2 by updating the inputs of the bit lines for two times by the control circuit. As shown in FIG. 6B, during a first time period T1 the pixel data X11, X21, X31, X41, X12, X22, X32, X42 are input to the bit lines BL1~BL8 respectively. During a second time period T2, the control circuit maintains the inputs on the bit lines BL5~BL8, and updates the pixel data X13, X23, X33, X43 to the bit lines BL1~BL4 respectively. During a third time period T3, the control circuit maintains the inputs on the bit lines BL1~BL4, and updates the pixel data X14, X24, X34, X44 to the bit lines BL1~BL4 respectively.

During the time period T1, the control circuit enables the word lines WL1, WL3, WL5, WL7, WL9, WL11 to obtain F11, F21, F31, G11, G21, G31. During the time period T2, the control circuit enables the word lines WL2, WL4, WL6, WL8, WL10, WL12 to obtain F12, F22, F32, G12, G22, G32. During the third period T3, the control circuit enables the word lines WL1, WL3, WL5, WL7, WL9, WL11 to obtain F13, F23, F33, G13, G23, G33.

In this embodiment, by configuring different arrangement of the factors of the filters F1, F2 on the different word lines, not only power consumption may be reduced, the time of operation may even be reduced.

Noted that, the various embodiments are only for purpose of description, although the size of the image IMG and the filters F1, F2 are 4×4, 2×2 as the examples, the present invention is applicable for any size image and filter. In addition, the number of bit lines, word lines and factor units of the memory device may be designed according to different requirements.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, comprising:
   a plurality of bit lines, configured to receive a plurality of pixel data of an image;
   a plurality of word lines, each of the word lines comprising a plurality of factor units, and each of the word lines coupled to the bit lines via the factor units, wherein the factor units of each of the word lines are configured according to a plurality of factors of a filter, and the configurations of the factor units of the word lines are different from each other; and
   a control circuit, coupled to the bit lines and the word lines,
   wherein when processing a first area of the image by the filter, the control circuit inputs the pixel data within the first area of the image to the bit lines, and enables one of the word lines for operation, when processing a second area of the image by the filter, the control circuit maintains the pixel data within the second area overlapping the first area on the bit lines, and inputs the pixel data within the second area which doesn't overlap the first area to the bit lines, and enables another one of the word lines for operation.

2. The memory device according to claim 1, wherein the configurations of the factor units are fixed, and are pre-set in the memory device; or the configurations of the factor units are changeable, and are programmed according to a factor configuration table stored in the memory device or an external device.

3. The memory device according to claim 1, wherein the control circuit determines the word line for operation according to a factor configuration table or a relative position between the filter and the image.

4. The memory device according to claim 1, wherein each of the factor units comprises one or more resistors, and the resistance of the one or more resistors are configured according to the factors of the filter.

5. The memory device according to claim 1, wherein the configurations of the factor units of the word lines is corresponding to different arrangement of the factors of the filter.

6. An operation method of memory device, comprising:
   providing an image, wherein the image comprises a plurality of pixel data;
   when processing a first area of the image by a filter, inputting, by a control circuit of the memory device, the pixel data within the first area of the image to a plurality of bit lines of the memory device;
   enabling, by the control circuit, one of a plurality of word lines of the memory device for operation, wherein each of the word lines comprises a plurality of factor units, the factor units of each of the word lines are configured according to a plurality of factors of the filter, and the configurations of the factor units of the word lines are different from each other;
   when processing a second area of the image, maintaining, by the filter, the control circuit, the pixel data within the second area overlapping the first area on the bit lines, and inputting the pixel data within the second area which doesn't overlap the first area to the bit lines; and
   enabling, by the filter, the control circuit, another one of the word lines for operation.

7. The operation method according to claim 6, wherein the configurations of the factor units are fixed, and are pre-set in the memory device; or the configurations of the factor units are changeable, and are programmed according to a factor configuration table stored in the memory device or an external device.

8. The operation method according to claim 6, wherein the control circuit determines the word line for operation according to a factor configuration table or a relative position between the filter and the image.

9. The operation method according to claim 6, wherein each of the factor units comprises one or more resistors, and the resistance of the one or more resistors are configured according to the factors of the filter.

10. The operation method according to claim 6, wherein the configurations of the factor units of the word lines is corresponding to different arrangement of the factors of the filter.

* * * * *